(12) United States Patent
Najafi et al.

(10) Patent No.: US 8,206,667 B2
(45) Date of Patent: Jun. 26, 2012

(54) MEMBRANE REACTOR WITH IN-SITU DEHYDRATION AND METHOD FOR USING THE SAME

(75) Inventors: Babak Fayyaz Najafi, Richmond, CA (US); Charles Leonard Kibby, Benicia, CA (US); Steven Xuqi Song, Albany, CA (US); Daniel Chinn, Bay Point, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 480 days.

(21) Appl. No.: 12/342,799

(22) Filed: Dec. 23, 2008

(65) Prior Publication Data

US 2009/0170964 A1    Jul. 2, 2009

Related U.S. Application Data

(60) Provisional application No. 61/018,378, filed on Dec. 31, 2007.

(51) Int. Cl.
*B01J 8/00* (2006.01)
(52) U.S. Cl. ......... 422/626; 422/637; 422/658; 422/239
(58) Field of Classification Search .................. 422/617, 422/626, 631, 632, 637, 650, 658, 659, 239
See application file for complete search history.

(56) References Cited

U.S. PATENT DOCUMENTS

| | | | |
|---|---|---|---|
| 6,403,660 B1 | 6/2002 | Espinoza et al. | |
| 7,214,719 B2 | 5/2007 | Jansen et al. | |
| 2003/0068261 A1* | 4/2003 | Taheri et al. | 422/211 |
| 2003/0068790 A1 | 4/2003 | Van Gemert et al. | |
| 2004/0018134 A1* | 1/2004 | Liu et al. | 423/247 |

(Continued)

FOREIGN PATENT DOCUMENTS
WO    WO-99/59711    11/1999
(Continued)

OTHER PUBLICATIONS

International Preliminary Report on Patentability for PCT/US2008/088247 mailed Apr. 16, 2008 (4 pages).

(Continued)

*Primary Examiner* — Walter D Griffin
*Assistant Examiner* — Timothy Cleveland
(74) *Attorney, Agent, or Firm* — Richard J. Schulte (57) ABSTRACT

A fixed bed membrane reactor is disclosed. The reactor has a housing including an inlet for receiving reactants and an outlet for discharging retentate streams of reaction products. The inlet and outlet are in fluid communication with a reaction zone in which the reactants may pass downstream from the inlet to the outlet with the reactants reacting to produce reaction products including water. The reactor further includes a membrane assembly disposed in fluid communication with the reaction zone. The membrane assembly includes at least one porous support with a water permselective membrane affixed thereto. The membrane allows water produced in the reaction zone to be selectively removed from the reaction zone as a permeate stream while allowing retentate reaction products to remain in the reaction zone and be discharged as a retentate stream. Ideally, the membrane assembly locates most of the membrane proximate the downstream portion of the reaction zone where accumulated produced water may be selectively removed from the reaction product as opposed to the upstream portion where relatively little water accumulation has occurred. A method for using the reactor to perform in situ water dehydration of reactions, such as Fischer-Tropsch reaction, is also disclosed.

12 Claims, 12 Drawing Sheets

U.S. PATENT DOCUMENTS

2004/0064002 A1    4/2004    Lee et al.
2004/0136883 A1*  7/2004    Buxbaum .................... 422/239
2005/0284290 A1    12/2005   Pruet
2007/0269356 A1*  11/2007  Mori et al. .................... 422/239

FOREIGN PATENT DOCUMENTS

WO    WO 2006082933 A1 *  8/2006

OTHER PUBLICATIONS

D. Unruh, et al., In-situ Removal of $H_2O$ during Fischer-Tropsch Synthesis—a Modeling Study, DGMK-Conference "Chances for Innovative Processes at the Inteface between Refining and Petrocheistry", 2002, pp. 287-294.

Espinoza, et al., Use of membranes in Fischer-Tropsch reactors, Studies in Surface Science and Catalysis 130, Jul. 9-14, 2000, vol. 130, pp. 388-394.

Rhode, et al., Fischer-Tropsch Synthesis with In-situ $H_2O$ Removal by a New Hydrophilic Mebrane—An Experimental and Modeling Study, DGMK/SCI-Conference "Synthesis Gas Chemistry", Oct. 4-6, 2006, pp. 215-221.

Rhode, et al., Membrane Application in Fischer-Tropsch Synthesis to Enhance $CO_2$ Hydrogenation, Ind. Eng. Chem. Res. 2005, vol. 44, pp. 9653-9658.

Rhode M P et al., Membrane application in Fischer-Tropsch synthesis reactors—Overview of concepts, Catalysis Today, Oct. 15, 2005, pp. 143-148, vol. 106, No. 1-4, Elsevier.

* cited by examiner

MEMBRANE REACTOR WITH IN-SITU DEHYDRATION AND METHOD FOR USING THE SAME

This application claims priority to Provisional Application Ser. No. 61/018,378, filed Dec. 31, 2007 as allowed under 35 USC 119(e). This application claims priority to and benefits from the foregoing, the disclosure of which incorporated herein by reference.

FIELD OF THE INVENTION

The present invention relates generally to methods and apparatus wherein water is produced as part of a chemical reaction and the water is removed in-situ from the reaction products, and more particularly, to methods and apparatus which use in-situ dehydration during the synthesis of F-T products using membranes to remove produced water.

BACKGROUND OF THE INVENTION

Water vapor is a primary by-product in a Fischer-Tropsch (FT) reaction and its presence is generally detrimental to the overall efficiency of the FT reaction. In a FT reaction, a synthetic gas mixture of carbon monoxide (CO) and hydrogen gas ($H_2$), referred to hereinafter as "syngas", is converted in the presence of a FT catalyst into hydrocarbon products, water vapor and other byproducts. The syngas may be generated from a number of carbon containing sources such as natural gas, coal (fossil), or bio-mass (renewable). It is often desirable to convert these carbon sources into a liquid hydrocarbon form from their original gas or solid states. There are two major types of catalysts used to catalyze this reaction: iron (Fe)-based catalysts and cobalt (Co)-based catalysts. The FT reaction is a relatively high temperature catalytic reaction. Accordingly, the water produced is generally in the form of water vapor.

Due to the adverse effects of water on this reaction, conventional FT reactors have a relative low rate of per-pass CO conversion. Conventional FT reactors separate water from other reaction products and un-reacted CO and $H_2$ gas after they exit the reactor's outlet. The un-reacted CO is often recycled back to a FT reactor inlet so that it may again potentially be converted into a hydrocarbon.

Efforts with respect to in-situ dehydration in F-T conversion of syngas to hydrocarbon products and water has described in several references. A first example is Espinoza et al., U.S. Pat. No. 6,403,660, which describes the use of slurry and fluidize beds to produce F-T hydrocarbon products. In the case of a slurry bed, a membrane apparatus is disposed within the liquid slurry and is used to remove water from the slurry. In another embodiment, a fluidized bed is used with a membrane apparatus again being disposed in a bed of catalyst. This membrane removes water from the bed during the production of F-T products and accompanying water. However, slurry and fluidized beds have shortcomings relative to using fixed bed reactors.

Rohde et al. proposed a fixed bed reactor with silica membrane or a Ceramic Supported Polymer (CSP) membrane with iron catalyst. For example, see M. P. Rohde, et al., "Membrane Application in Fischer-Tropsch Synthesis Reactor—Overview of Concept," Catalysis Today 106 (2005) 143-148; and D. Unruh, et al., "In-situ Removal of $H_2O$ During Fischer-Tropsch Synthesis—A Modeling Study," and DGMK-Conference, "Chances For Innovative Processes at The Interface Between Refining and Pertochemistry," Berlin, 2002, Germany. However, these references fail to address heat management in terms of using commercial viable methods. Also, the use of membranes is not optimized to perform water separation where most produced water has been accumulated.

There is a need for improved designs for reactors in which water is removed in-situ during reactions in which the presence of produced water is detrimental and wherein heat management issues and water removal are also addressed as well as efficient distribution and use of membrane materials.

SUMMARY OF THE INVENTION

A membrane reactor is disclosed. The reactor includes a housing including an inlet for receiving reactants and an outlet for discharging retentate streams of reaction products. The inlet and outlet are in fluid communication with a reaction zone in which the reactants may pass downstream from the inlet to the outlet with the reactants reacting to produce reaction products including water. The reactor further includes a membrane assembly disposed in fluid communication with the reaction zone. The membrane assembly includes at least one porous support with a water permselective membrane affixed thereto. The membrane allows at least some of the water produced in the reaction zone to be selectively removed from the reaction zone as a permeate stream while allowing retentate reaction products to remain in the reaction zone and be discharged as a retentate stream. In one embodiment, the membrane assembly locates most of the membrane proximate the downstream portion of the reaction zone where accumulated produced water may be selectively removed from the reaction product as opposed to the upstream portion where relatively little water has been produced and accumulation has occurred. A method for using the reactor to perform in situ water dehydration of reactions, such as a Fischer-Tropsch reaction, is also disclosed.

BRIEF DESCRIPTION OF THE DRAWINGS

These and other objects, features and advantages of the present invention will become better understood with regard to the following description, appended accumulated claims and accompanying drawings where:

DETAILED DESCRIPTION

Figure 1:
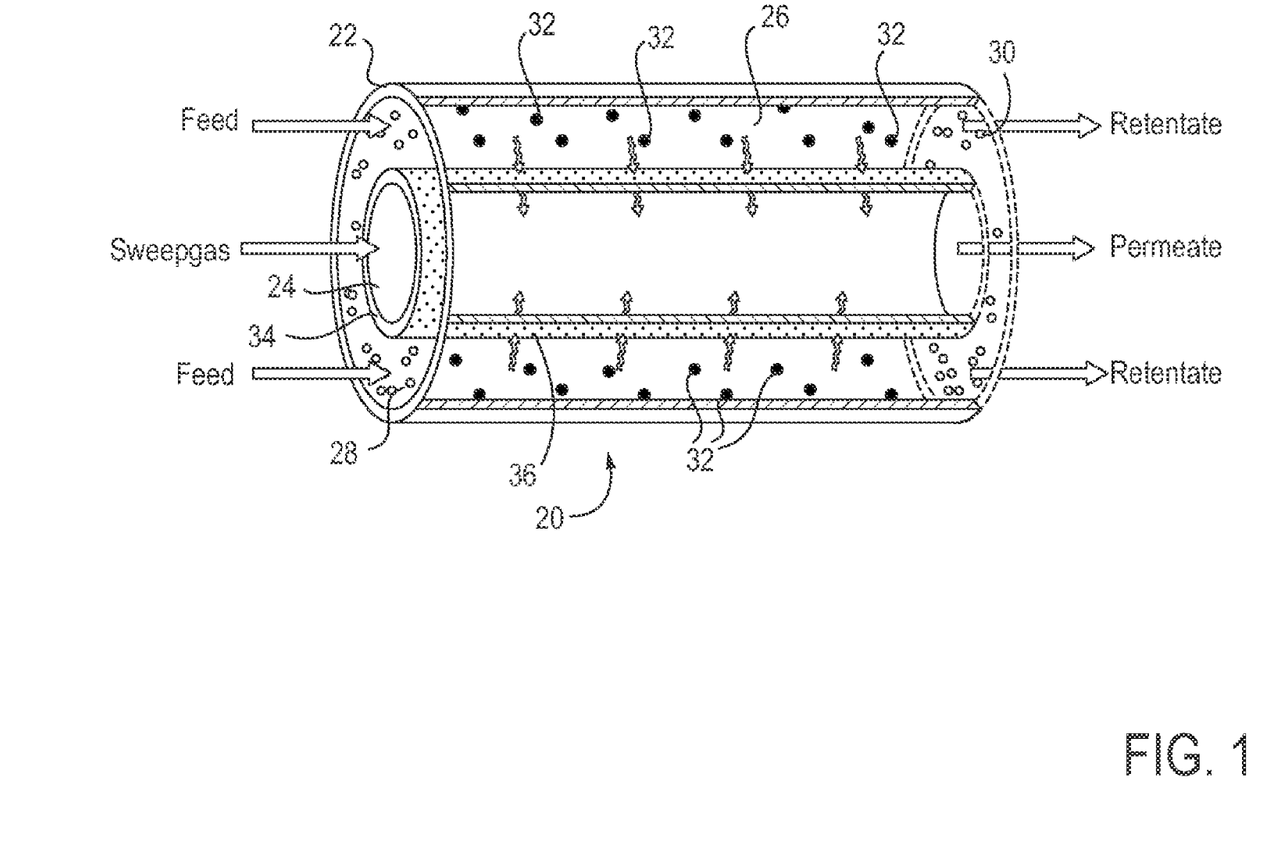
FIG. 1 is a schematic drawing of an FT packed bed membrane reactor (PBMR), including an in-situ water removal membrane, which was used in a computer model to estimate the effects of in situ dehydration during FT reactions.

FIG. 1 illustrates a schematic drawing of a first embodiment of a packed bed membrane reactor (PBMR) 20 in which chemical reactions, which produce water as a by-product, can be dehydrated in situ. This embodiment was computer modeled to study the effects of varying process variables during in-situ dehydration of conversion reactions. By way of example and not limitation, examples of these types of reactions are Fischer-Tropsch (FT) reactions in which syngas (CO and $H_2$) will react over an iron-based or cobalt-based catalyst to produce hydrocarbons and water. Examples of potential reactions include:

Paraffin Formation $$nCO+(2n+1)H_2 \rightarrow C_nH_{2n+2}+nH_2O \ (n \geq 1); \qquad (1)$$

Olefin Formation $$nCO+2nH_2 \rightarrow C_nH_{2n}+nH_2O \ (n \geq 2); \text{ and} \qquad (2)$$

Water Gas Shift Reaction $$CO+H_2O \rightarrow CO_2+H_2. \qquad (3)$$

Reactor:

Reactor 20 is a fixed bed or packed bed membrane reactor (PBMR). Reactor 20 includes an outer shell 22 and a coaxially aligned inner membrane tube 24 which cooperate with one another to form an annular reaction zone 26 there between. Upstream and downstream perforated end caps 28, 30 also assist in defining reaction zone 26 and capturing the packed FT catalyst 32 within reaction zone 26. Inner membrane tube 24 includes a porous support member 34 upon which a water permselective membrane 36 is affixed. The membrane material may be affixed either on the radial inside or outside of support member 34. Water permselective membrane 36 is ideally chosen to permit water vapor to radially pass there through while inhibiting the passage of other reactants and products contained with reaction zone 26. For example, the membrane may be made of an appropriate zeolite or other permselective membrane known in the art.

Reaction Conditions:

Typically, the reaction conditions include using a suitable FT catalyst such as an iron-based or cobalt-based catalyst or a mixture of both. The pressure in reaction zone 26 is ideally maintained at an elevated pressure of 5-40 bar. The temperature in reaction zone 26 is maintained in the range of 170-400° C. More preferably, the temperature is kept at about 180-220° C. for cobalt-based catalysts and about 250-280° C. for iron-based catalysts. A clam shell heater (not shown) may surround reactor 20 during operation to maintain reaction zone 26 at a desired generally isothermal operating temperature. The pressure within inner membrane tube 24 is maintained at a much lower pressure than that in reaction zone 26 where the FT conversions take place. A sweep gas can be used optionally to further reduce the partial pressure of water on the permeate side of membrane 36 and hence increase the driving force for the water separation. The syngas feed $H_2/CO$ molar ratio may be on the range of 1-3 and more preferably is about 1:2.

Operation:

In operation, a syngas feed is introduced to an upstream end cap 28 and into reaction zone 26. Under suitable reaction conditions, as described hereinafter and in Table 1 below, reactions identified in equations (1), (2), and (3) and others occur. Reaction products include hydrocarbon products of varying carbon chain lengths, $CO_2$ and water and a variety of other compounds. Under these conditions, the water is in the form of water vapor. Accordingly, water vapor preferentially passes through the permselective membrane 36 as a permeate while the other reaction products and un-reacted feed preferentially remain in the annular reaction zone 26 and are eventually discharged as a part of a retentate stream through the perforated downstream end cap 30. Ideally, un-reacted $H_2$ an CO gases will be separated from the discharged retentate stream and recycled and reintroduced (not shown) into the upstream portion of reaction zone 26 and/or to a syngas reformer (not shown) using processes known in the art.

As an alternate design to that shown in FIG. 1, the catalyst may be packed inside the inner membrane tube 26 rather than in the annular reaction zone 24. In this case, a syngas feed can enter inside the inner membrane tube 26 and be converted therein to FT products and water. A sweep gas may be introduced in the annular reaction zone 24. The retentate stream will exit from within the inner membrane tube 26 while the permeate stream will exit from the annular reaction zone 24.

Computer Model and Modeling Results

As described below, a computer simulation study shows that using a zeolite membrane in a Packed Bed Membrane Reactor (PBMR) utilizing a cobalt catalyst enhances the overall FT process performance. In order to be able to optimize the membrane usage in this reaction, it is important to understand the effect of water removal on reaction rates and hydrocarbon yields. Ideally, membrane properties are matched with reaction rates to optimize the reactor design.

Computer models were generated corresponding to the reactor embodiment shown in FIG. 1. Table 1 describes base case conditions used in the computer simulation. It assumed that the reactor 20 of FIG. 1 will be placed into a clam shell heater to maintain reaction zone 26 generally in an isothermal state. As the following examples show, in-situ water vapor removal has a definitive role in enhancing the F-T conversion process.

TABLE 1

Conditions used for simulation

Base Case Conditions

| Reactor Dimensions | | Operating Conditions | |
|---|---|---|---|
| Reactor diameter (in.) = | 1 | Operating temperature (° C.) = | 240 |
| Membrane diameter (cm) = | 1 | Feed inlet pressure (bar) = | 21 |
| | | Permeate pressure (bar) = | 7 |
| | | Feed $H_2$/CO molar ratio = | 2 |
| Reactor length (in.) = | 10 | Feed flow rate (mol/sec) = | 4.70E−03 |
| | | Sweep ratio = | 1 |
| Catalyst weight (gr) = | 81 | $W/F_{co}$ (gr · hr/mol) = | 7 |
| | | Superficial velocity (m/sec) = | 25 |
| Cobalt catalyst | | | |

| Ideal Membrane[§] Properties | |
|---|---|
| Perm $H_2O$ (mol/(sec · cm$^2$ · bar)) = | 1.38e−5 |
| Perm $H_2$ (mol/(sec · cm$^2$ · bar)) = | 0 |
| Perm CO (mol/(sec · cm$^2$ · bar)) = | 0 |
| Perm $CO_2$ (mol/(sec · cm$^2$ · bar)) = | 0 |
| Perm $CH_4$ (mol/(sec · cm$^2$ · bar)) = | 0 |
| Perm $C_8$ (mol/(sec · cm$^2$ · bar)) = | 0 |
| Perm others (mol/(sec · cm$^2$ · bar)) = | 0 |

[§]Ideal membrane: will pass only water

Example 1

Effect of Membrane on CO Conversion

Figure 2:
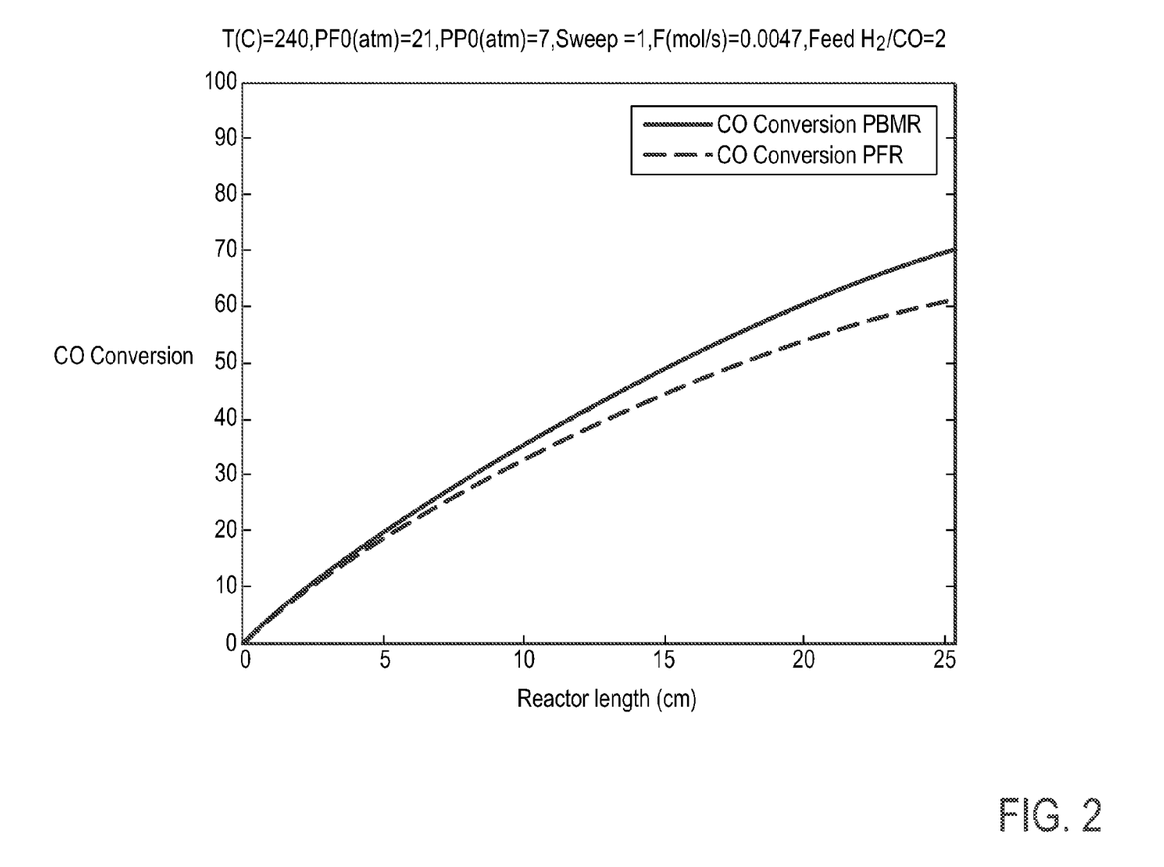
FIG. 2 is a graph showing the computational effect of utilizing and not utilizing a membrane to remove water on CO conversion in a PBMR and in a comparable Plug Flow Reactor (PFR), in which no in situ water removal occurs.

Integrating a membrane in a FT reactor will enhance CO conversion as compared with a comparable plug flow reactor (PFR). A comparable PFR is defined as a reactor having an equivalent size and configuration as the PBMR shown in FIG. 1, except that the inner tube is not porous, has no membrane, and has no provisions for a sweep gas. CO conversion results from running the simulation are shown in FIG. 2. CO conversion in the PBMR is better than PFR the farther downstream CO conversion occurs in a respective reactor, as indicated in FIG. 2.

Example 2

Effect of Membrane on $H_2O$ Partial Pressure

Figure 3:
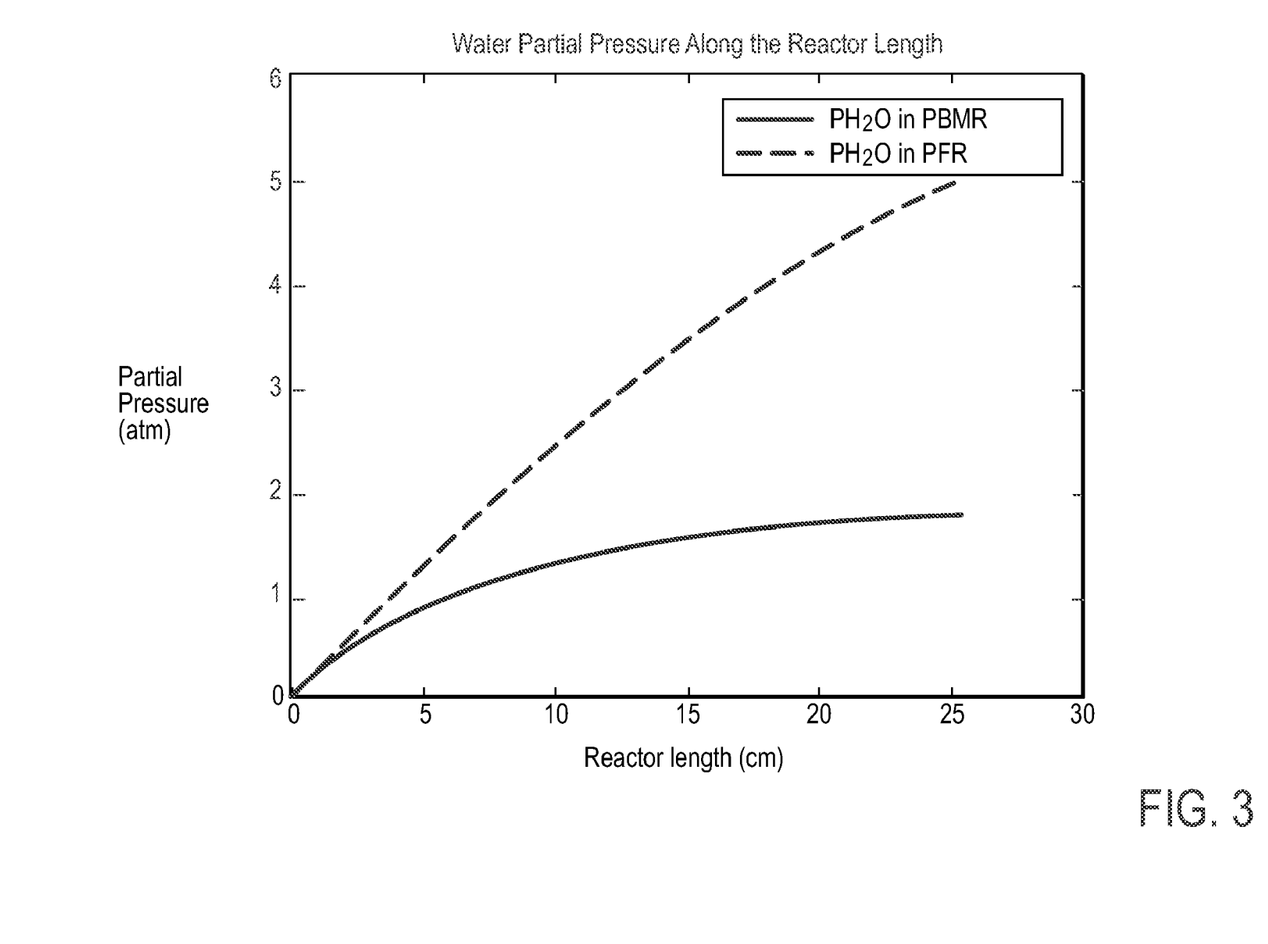
FIG. 3 is a graph showing the computational effect of utilizing a membrane on $H_2O$ partial pressure using a PBMR and a PFR.

A water permselective membrane will remove water vapor from the reaction medium and hence lowers water partial pressure in the reactor. This reduces catalyst deactivation and hence will increase life of a catalyst. FIG. 3 shows the calculated effect of how using a membrane in the PBMR will decrease water partial pressure relative to the use of a comparable PFR.

Example 3

Effect of In-Situ Water Vapor Removal on FT Reaction

Figure 4A:
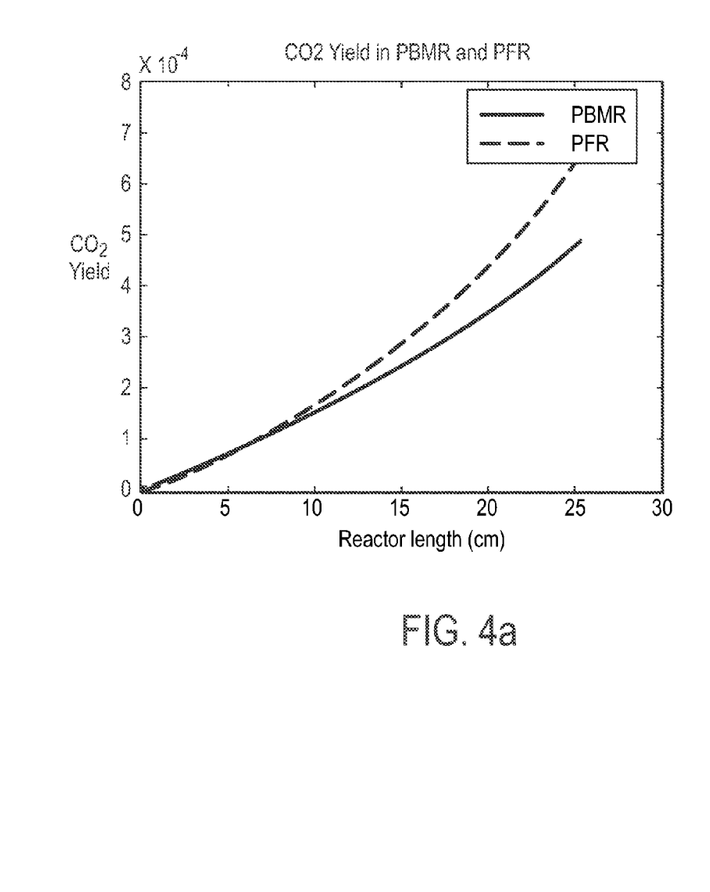
FIGS. 4(a) and (b) show graphs depicting the computational effect of utilizing a membrane on $CO_2$ yield and hydrocarbon yield in PBMR and PFR.
Figure 4B:
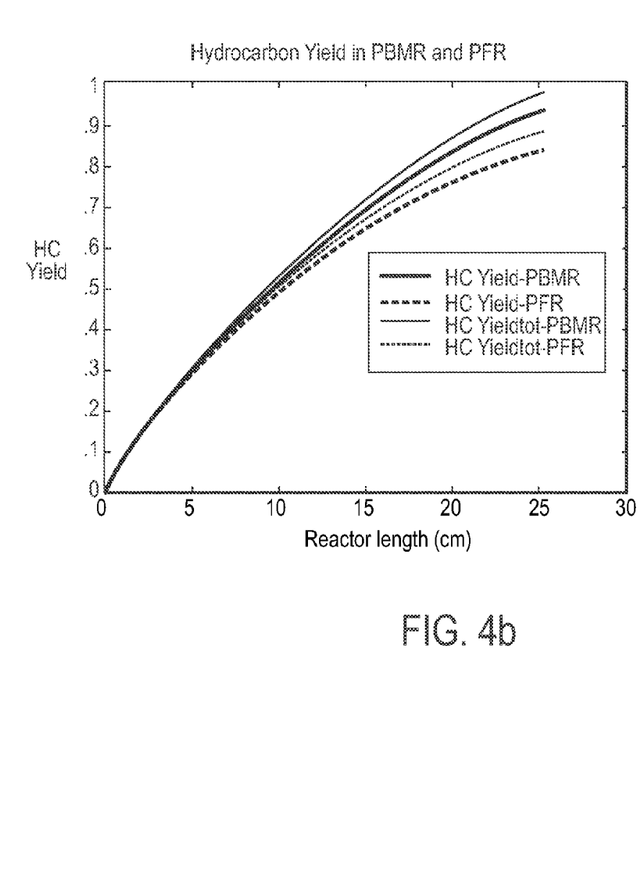
Figure 5A:
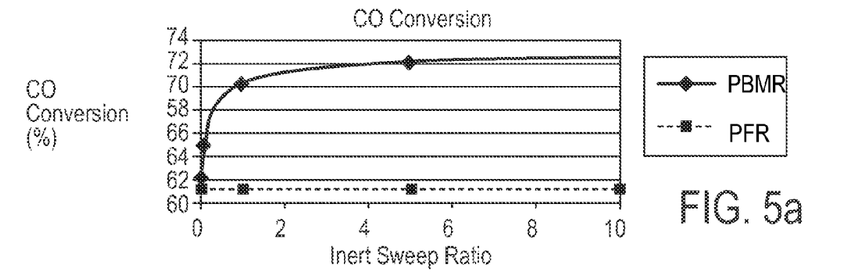
FIGS. 5(a)-(d) show the computational effect of sweep ratio on CO conversion, water partial pressure, hydrocarbon yield and on the amount of extra catalyst weight required in a PFR to achieve the same hydrocarbon yield as in a PBMR.
Figure 5B:
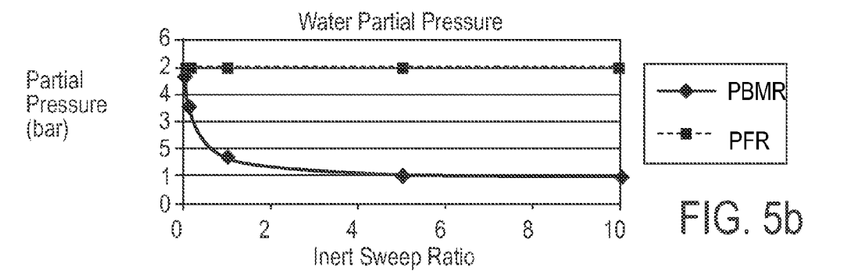
Figure 5C:
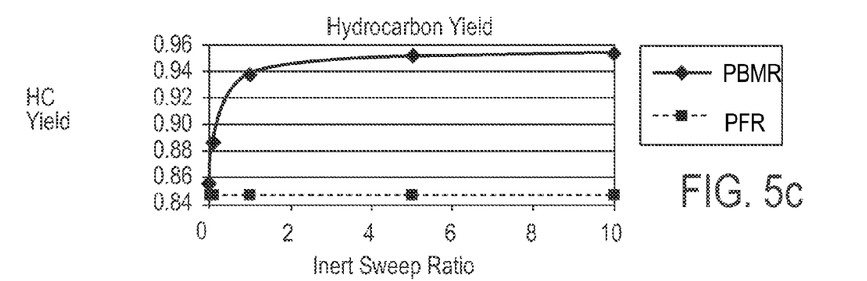
Figure 5D:
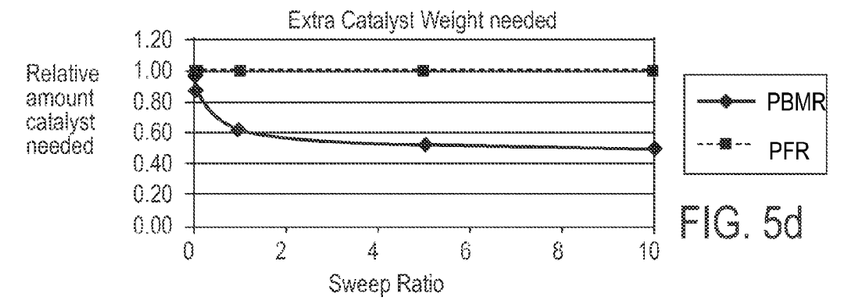
Figure 6A:
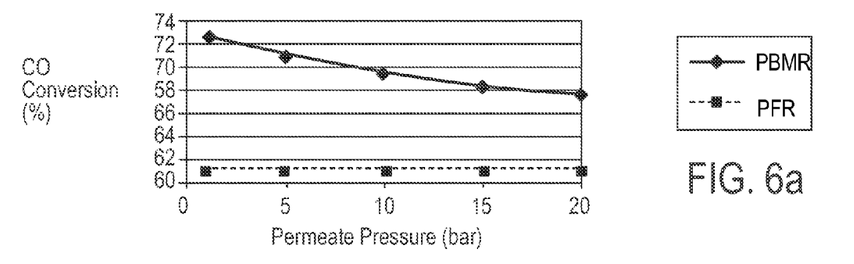
FIGS. 6(a)-(d) show the computational effect of permeate side pressure on CO conversion, water partial pressure, hydrocarbon yield and the amount of extra catalyst weight required in a PFR to achieve the same hydrocarbon yield as in a PBMR.
Figure 6B:
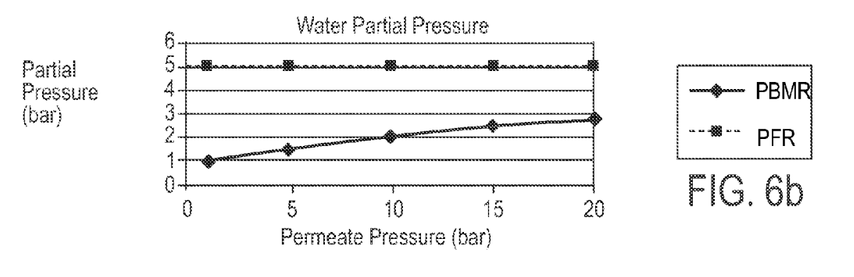
Figure 6C:
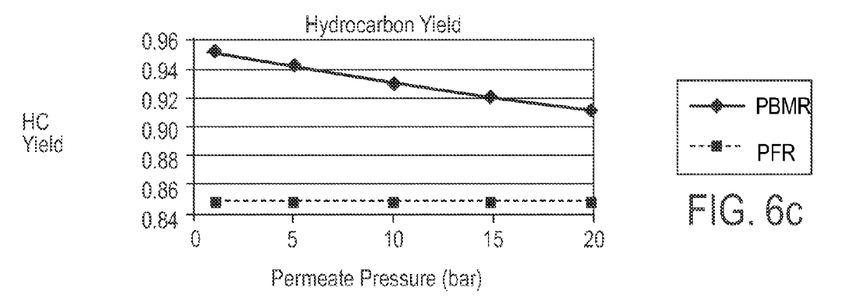
Figure 6D:
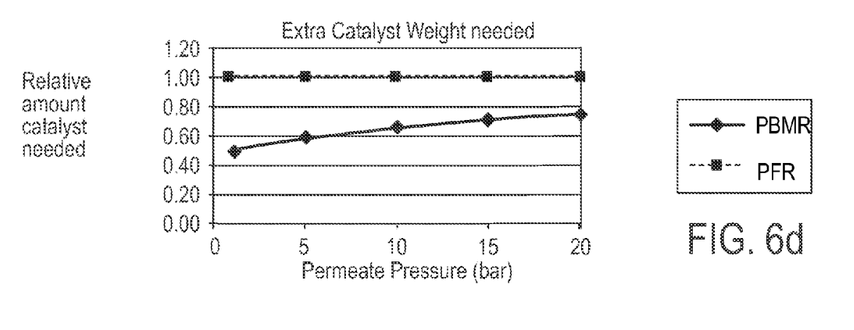

FIGS. 4(a) and 4(b) show the calculated effect of in-situ water removal on FT reactions. By removing water, less $CO_2$ will form through water-gas shift reactions. Furthermore, partial pressure of the other components will increase and the rate of hydrocarbon formation will increase. The overall result is that less $CO_2$ will form and hydrocarbon yield will increase. Hydrocarbon Yield (HC Yield) in the graphs refers to the amount of produced (all) hydrocarbons (minus $C_1$ and $C_2$) per mole of CO feed to the reactor.

Example 4

Effect of Sweep Ratio

FIGS. 5(a)-(d) illustrate the calculated effect of sweep ratio on CO conversion, water partial pressure, hydrocarbon yield and the amount of extra catalyst weight required in a PFR to achieve the same hydrocarbon yield as in a PBMR. Sweep gas ratio is defined as the mole of sweep gas per total mol of feed gas.

Example 5

Effect of Permeate Side Pressure

FIGS. 6(a)-(d) show the calculated effect of permeate side pressure on CO conversion, water partial pressure, hydrocarbon yield and amount of extra catalyst weight required in a PFR to achieve the same hydrocarbon yield as in a comparable PBMR.

Example 6

Figure 7A:
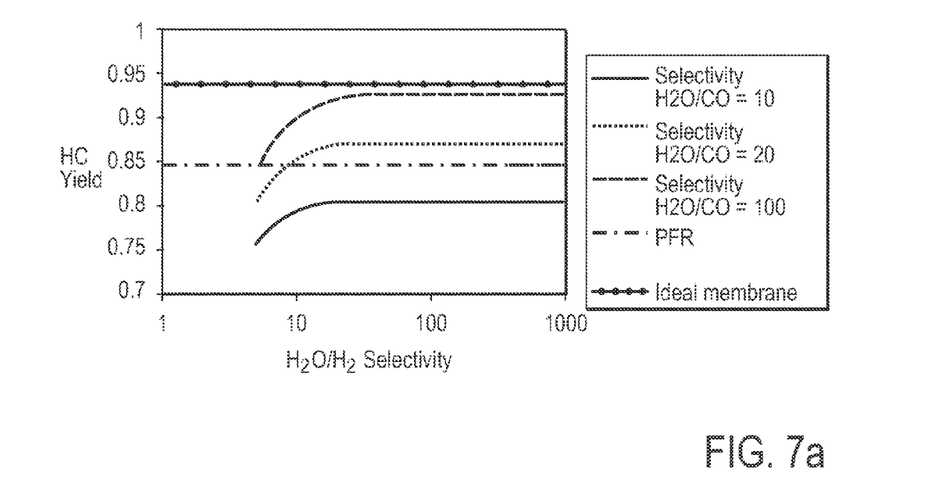
FIGS. 7(a) and (b) show the computational effect of membrane separation properties on hydrocarbon yield and CO conversion for a non-ideal membrane using an inert sweep gas.
Figure 7B:
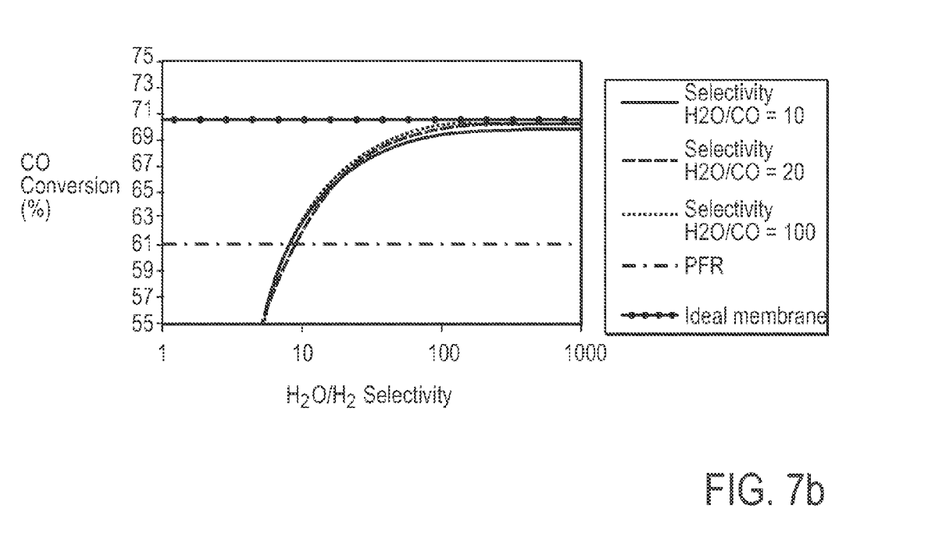

Effect of a Membrane Separation Properties on Hydrocarbon Yield and CO Conversion for Non-Ideal Membrane with Inert Sweep Gas FIGS. 7(a)-(b) show calculated results of membrane separation properties variation on hydrocarbon yield and CO conversion in FT reaction using a non-ideal membrane when an inert sweep gas has been used. That is, when components other than water in the reaction gas are permitted to selectively pass through the membrane. In these figures, water permeance was kept constant and separation properties of membrane have been changed. This study suggests targets for required membrane properties when a PBMR is compared with a comparable PFR, which does not utilize in situ dehydration.

Example 7

Figure 8A:
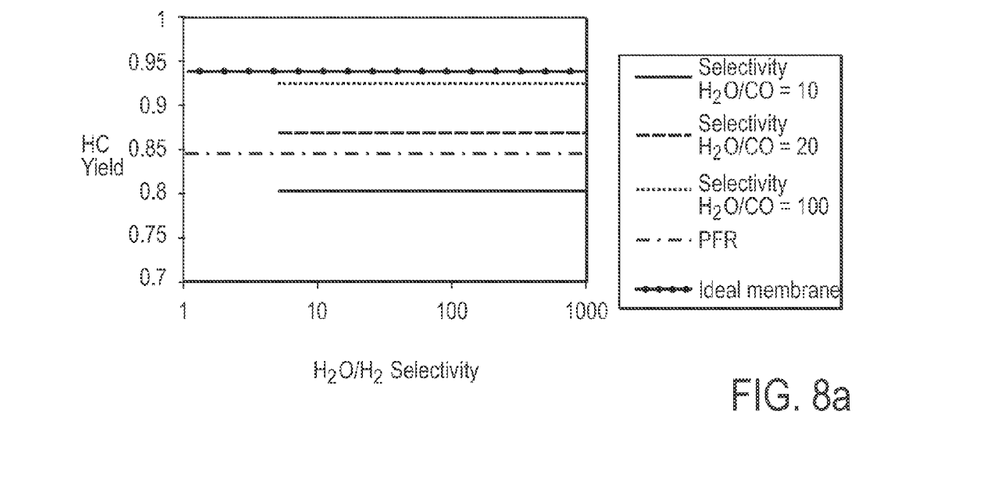
FIGS. 8(a) and (b) show the computational effect of membrane separation properties on hydrocarbon yield and CO conversion for a non-ideal membrane with hydrogen ($H_2$) as the sweep gas.
Figure 8B:
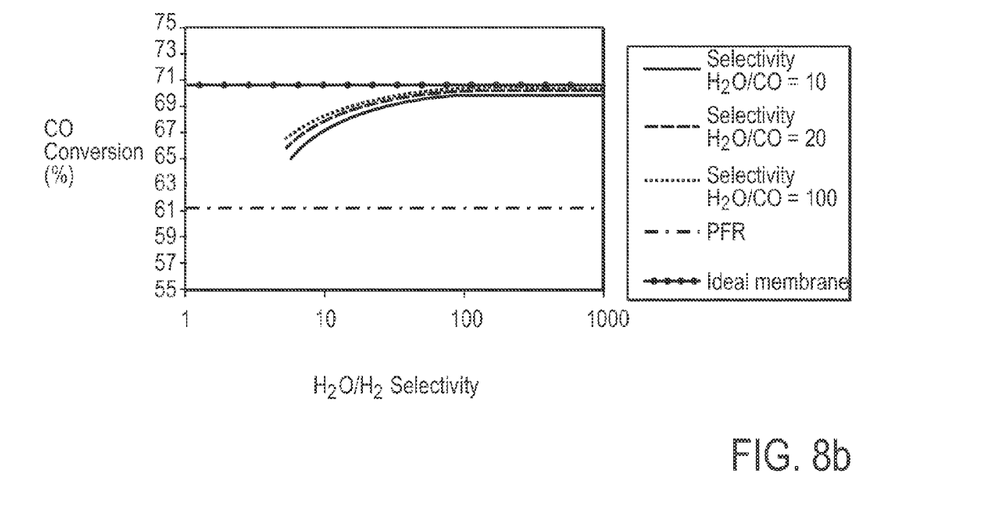

Effect of Membrane Separation Properties on Hydrocarbon Yield and CO Conversion for Non-Ideal Membrane with Hydrogen Sweep Gas FIGS. 8(a)-(b) illustrate the calculated results of this study as described in example 7 above, however, using hydrogen (which is a reactant) as the sweep gas rather than the inert gas.

Figure 9:
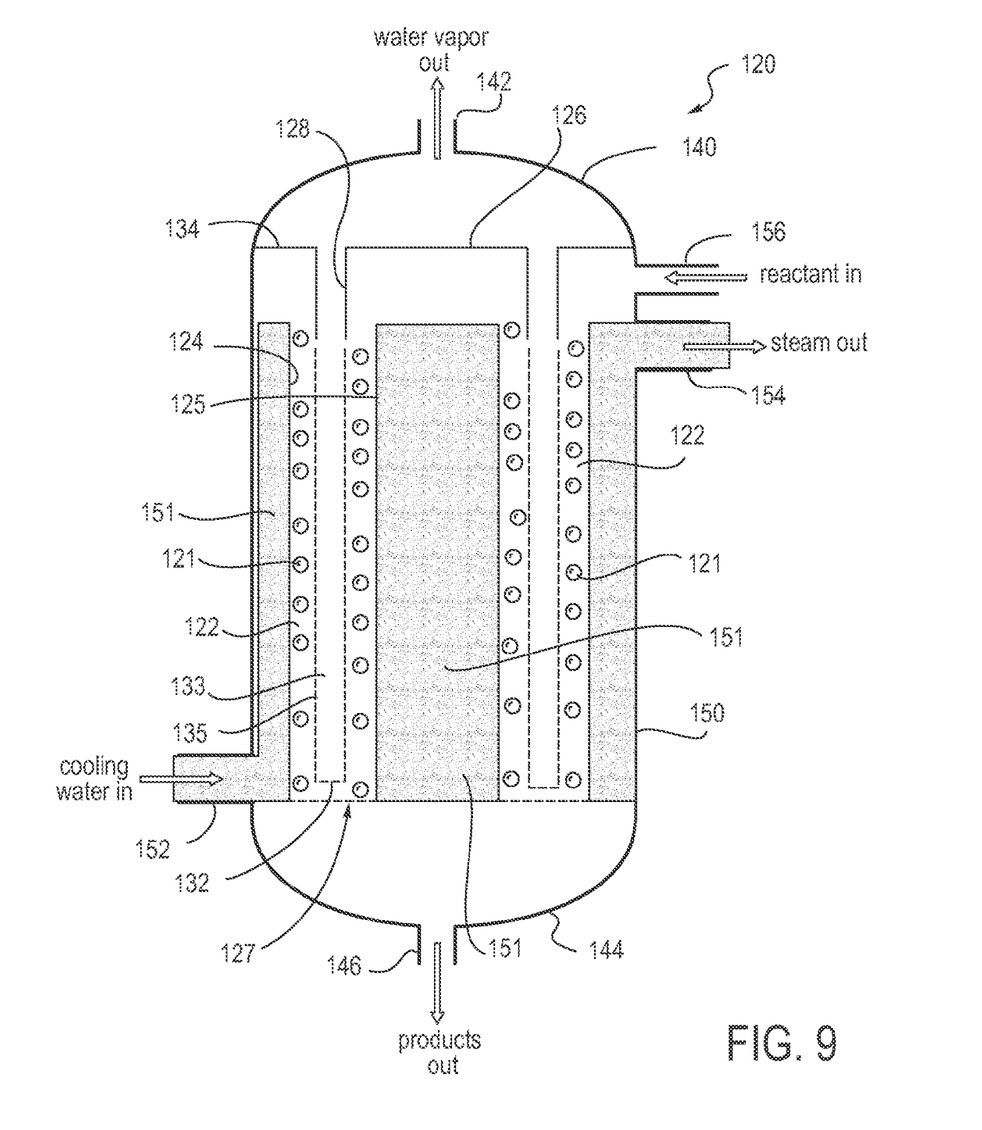
FIG. 9 is a schematic drawing of a second embodiment of a packed bed membrane reactor (PBMR) which utilizes a water coolant to maintain the reactor at a desired operating temperature, however, the reactor does not utilize a sweep gas to remove water vapor.

FIG. 9 shows a schematic of a second embodiment of a fixed bed membrane reactor (FBMR) 120 which does not employ a sweep gas to remove a permeate stream. Reactor 120 is a multi-double-tubular type reactor with catalyst 121 placed in a reaction zone 122 between outer and inner annular shell was 124 and 125 and an inner tubular membrane assembly 126. A removable catalyst support grid 127 is provided which can be opened to allow catalyst particles drain out for catalyst replacement.

Membrane assembly 126 includes multiple tubes 128 which are made of a porous material such as stainless steel or alumina. Tube wall 128 works to support a membrane or membrane film to withstand the pressure difference between reaction zone 122 and a vapor zone 133. An end cap 132 seals one end of tube 128 and forms water vapor zone 133. A water permselective material or membrane 135, such as a zeolite membrane, is affixed to either the inner or outer radial surface of tube 128 to allow water vapor to readily pass there through into vapor zone 133 from reaction zone 122 while inhibiting the passage of other reactants and products. The top of membrane apparatus 126 is sealed with tube sheet 134 (a tube sheet is a circular plate with multiple holes drilled with specific pattern to pass the membrane tubes.) to an upper end cap 140 which has a water vapor outlet 142. The downstream end of reactor 120 has an end cap 144 with a products outlet 146. An outer shell 150 provides a water bath chamber 151, surrounding reaction zone 122. Water inlet 152 and steam outlet 154 are in fluid communication with water chamber 151. Controlling the water flow and the pressure and boiling temperature of water in water bath chamber 151 allows the temperature in reaction zone 122 to be controlled. Reactor 120 also has a reactant inlet 156 for receiving a syngas feed into reaction zone 122.

In operation, reactants are introduced into reactor 120 by way of reactant inlet 156 into reaction zone 122. Reactants ($H_2$, CO, $CO_2$, $H_2O$) come in from the top of the tubular reactor and flow downward into the catalyst bed. In order to aid with the heat management, a small portion of liquid hydrocarbons may be added with the reactants to provide latent-heat of vaporization. FT conversions take place in reaction zone 122 with water vapor also being produced. A portion of the water vapor permeates from reaction zone 122 through permselective membrane 135 and into vapor zone 133 and exits reactor 120 by way of water vapor outlet 142. Water vapor zone 133 is operated at low pressure or even at vacuum conditions to improve the permeability of water vapor. Reaction conditions are selected to maintain only gas phase in the catalyst bed and ensure high permeability of vapor through the membrane.

Meanwhile, the FT products, un-reacted CO and $H_2$ gas pass downstream through the catalyst 121 in reaction zone 122 and exit through reactor outlet 146. Again, the in-situ dehydration of water in the reactor during the FT conversion provides enhancements in the FT conversion as demonstrated in the examples previously discussed. Water entering inlet 152 passes through cooling chamber 151, receives heat from reaction zone 122, becomes steam and exits out of reactor 120 by way of steam outlet 154.

Figure 10:
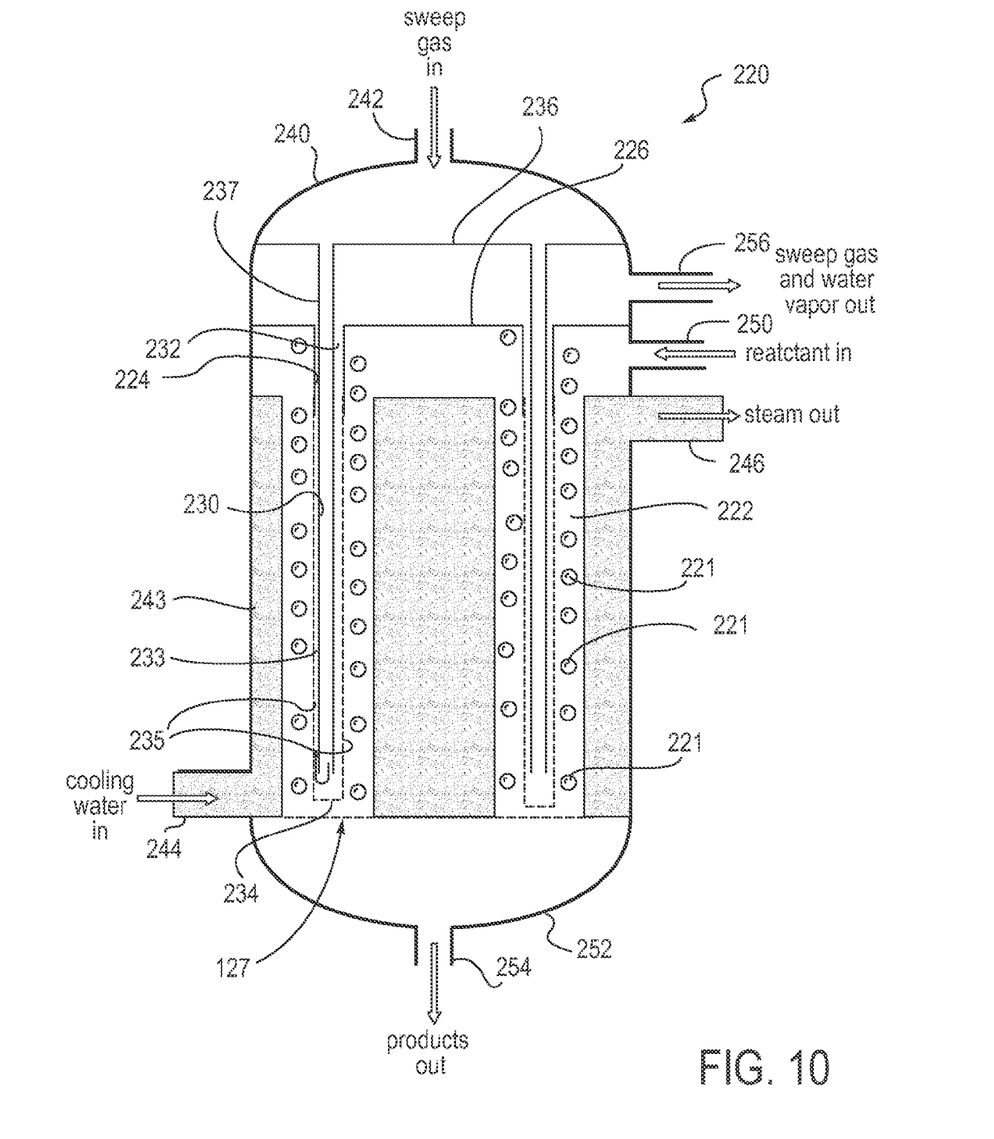
FIG. 10 is a schematic drawing of a third embodiment of a packed bed membrane reactor (PBMR) which does utilize a water coolant and a sweep gas.

A third embodiment of a FT reactor 220 is shown in FIG. 10. In this embodiment, the FT reactor has the capability of providing a sweep gas to enhance the in-situ water vapor removal from FT reactor 220. Similar to FT reactor 120, reactor 220 has catalyst 221 packed into a reaction zone 222 formed between tubes 224 and 230. Partially mounted in reaction zone 220 is a membrane assembly 226 which has multiple tubes with porous wall 230 and an end plate 234 which seals the tube, thereby defining an annular vapor zone 233. Membrane materials are affixed to support wall 230, such as a zeolite membrane 235, to permit water vapor to readily pass from reaction zone 222, through membrane 235 and into water vapor zone 233.

A mini-tubular sweep gas assembly 236 is provided for introducing a sweep gas into vapor zone 233. Sweep gas assembly 236 has multiple tubes 237 which are inserted into water vapor zone 233 and serve to deliver sweep gas to the lower end of water vapor zone 233. Sweep gas assembly 236 is in fluid communication with an end cap 240 which has a sweep gas inlet 242.

Located between tubes 224 is a water jacket 243 having a cooling water inlet 244 and a steam outlet 246. Reactor 220 has a reactant inlet 250 which introduces reactants, i.e. syngas, into reaction zone 222 and end cap 252 which receives FT products and un-reacted feed from reaction zone 222. Products outlet 254 allows FT products to exit reactor 220. Ideally, these products are then separated with un-reacted CO and $H_2$ gas again being recycled (not shown) back to reactant inlet 250.

In operation, a syngas feed is introduced into reactor 220 by way of reactant inlet 250 and into reaction zone 222. FT conversions take place in reaction zone 222 with FT products being produced and water vapor. The FT products and un-reacted feed stream is then allowed to exit FT reactor 220 by way of products outlet 254.

A significant portion of the water vapor produced passes through membrane 235 and into water vapor zone 233. The pressure in water vapor zone 233 is maintained at a relatively low pressure compared to reaction zone 222, in part, due to a sweep gas being provided to water vapor zone 233. Sweep gas is introduced into sweep gas inlet 242; passes inside the sweep gas tubes 237 to the lower end of water vapor zone 233; and then flows counter current to the syngas feed along membrane 235 to assist in the removal of water vapor. The sweep gas may be an inert gas or may be a gas such as reactant $H_2$ gas or other desired gases or gas mixtures. The water vapor is then swept out reactor 222 by way of water vapor outlet 256.

Water is introduced into cooling water inlet 244 and surrounds reaction zone 222 to maintain the temperature in reactor 220 at a predetermined temperature. Heat supplied from reaction zone 222 transforms the water into steam which exits reactor 220 by way of steam outlet 246.

Figure 11:
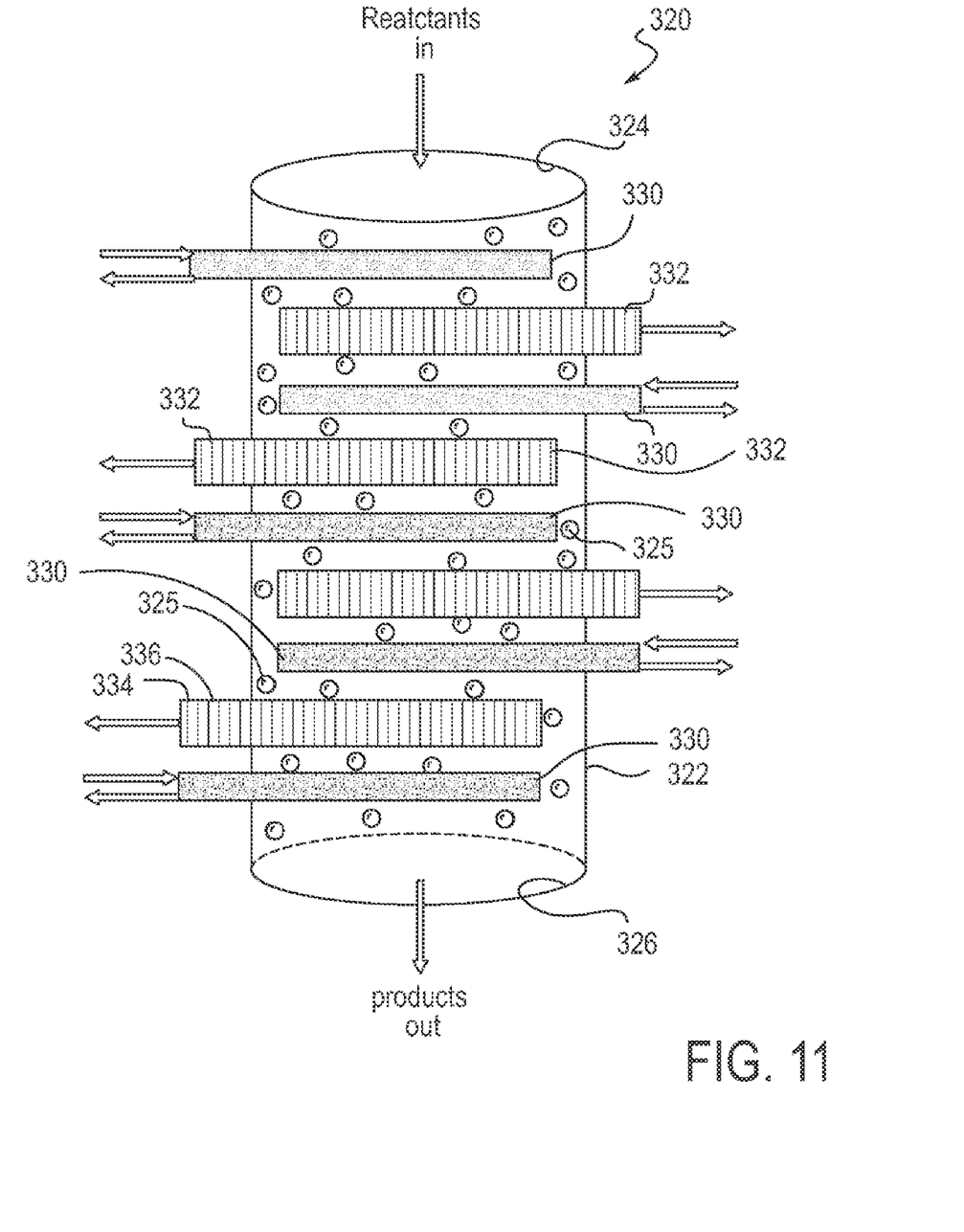
FIG. 11 is a schematic drawing of a fourth embodiment of a generally cylindrical packed bed membrane reactor (FBMR) which utilizes water coolants and axially spaced apart membranes to remove water at select axial locations along the reactor.

A fourth conceptual embodiment of a FT reactor 320 is shown schematically in FIG. 11. Reactor 320 includes a cylindrical outer shell 322 and an upstream inlet 324 and a downstream outlet 326. FT catalyst 325 is packed within outer shell 322. Axially spaced along reactor 320 are cooling coils 330 which receive cooling water, allowing the water to receive heat from the FT reactions and outlet steam from reactor 320.

Also, spaced intermittently along reactor 320 are membrane assemblies 332, which might be in the form of coils or radially-extending stakes. Membrane assemblies 332 include porous support members 334 which support permselective membrane materials forming membranes 336. Membrane assemblies 332 allow water vapor formed in a FT reactions to pass through membranes 336 and out of FT reactor 320. Preferably, the majority of membranes 336 are located closer to the downstream end 326 of FT reactor 320 than the upstream end 324. At the upstream end of FT reactor 320, relatively little water vapor has been formed as the syngas has just entered reactor 320. At the downstream end of FT reactor 320, all of the water vapor that will be formed has been formed. Accordingly, it is beneficial to place more of the membranes 336, i.e., membrane materials, and hence the ability to remove water vapor, toward the downstream outlet 326 rather than the upstream inlet 324.

Figure 12A:
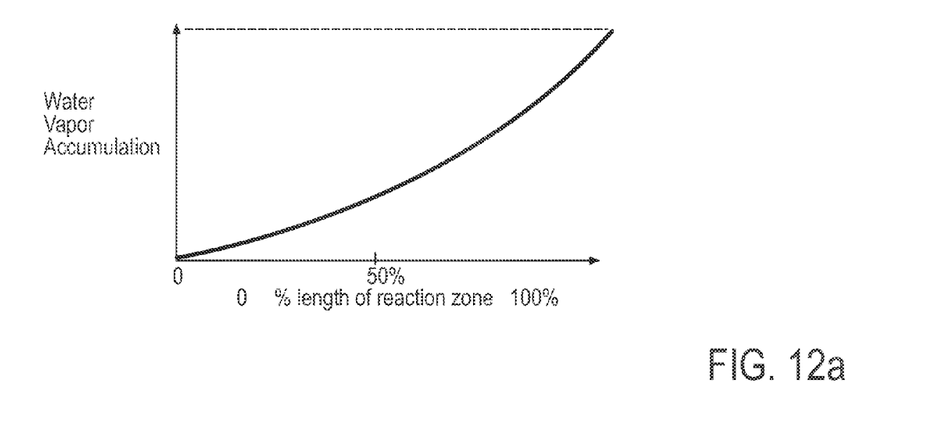
FIGS. 12(a)-(c) show (a) that water vapor accumulates when forming in a FT reaction with the majority of the accumulation near the downstream end portion, (b) a membrane assembly wherein the radius of membrane material increases from the upstream to the downstream end to provide greater water vapor permeability proximate the downstream end as compared to proximate upstream end, and (c) a membrane assembly containing spaced apart membrane disks wherein the disks are spaced closer together on the downstream portion of the membrane assembly as opposed to the upstream portion to provide an increasing amount of membrane material available for water removal from the upstream end to the downstream end.
Figure 12B:
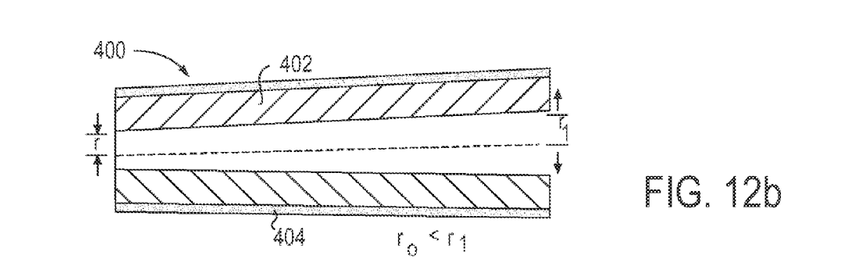
Figure 12C:
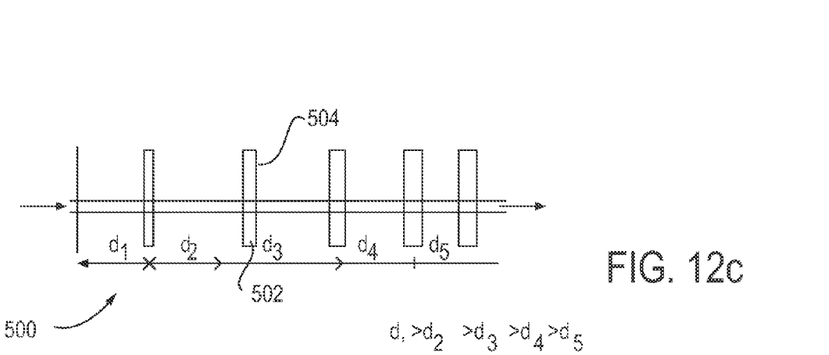

There are numerous ways in which the goal of providing more water vapor removal capability in the downstream portion as opposed to the upstream portion of PBMR can be accomplished. FIG. 12(*a*) suggests that most of the water accumulation occurs in the downstream portion of the reactor. One way to get continuous vapor removal while increasing membrane capacity is to use membrane assembly 400 having a porous generally frusto-conical shaped support member 402 supporting a membrane 404, as shown in FIG. 12(*b*). Membrane support 402 and membrane 404 will replace the membrane tube 24 of FIG. 1. The radius of this membrane 404 increases from its upstream end to it downstream end, i.e. $r_0 < r_1$. Corresponding to the fourth embodiment described above, FIG. 12(*c*) shows a simplified membrane assembly 500 wherein the spacing between porous support disks 502 affixed with membrane material decreases from an upstream end to a downstream end. A central conduit may serve to carry sweep gas and water vapor away from a reaction zone in a FT or other reactor. Alternatively, the diameter or width of membrane 504 on each of the disks 502 may be increased from the upstream end to the downstream end of membrane assembly 300.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A membrane reactor comprising:
   (a) a housing including an inlet for receiving reactants and an outlet for discharging retentate streams of reaction products, the inlet and outlet being in fluid communication with a reaction zone having an upstream portion and a downstream portion in which the reactants pass downstream from the inlet to the outlet with the reactants reacting to produce the reaction products including water vapor in the reaction zone; and
   (b) a membrane assembly disposed within the housing and having at least one water permselective membrane which is in fluid communication with the reaction zone to receive water vapor permeating there from and transporting the water vapor in a water vapor zone to an outlet for discharging the water vapor from the membrane reactor;
   wherein the membrane assembly has greater water vapor separation capability proximate the downstream portion of the reaction zone than proximate the upstream portion of the reaction zone.

2. The membrane reactor of claim 1 wherein the membrane assembly includes at least one porous support member supporting the at least one water permselective membrane.

3. The membrane reactor of claim 1 wherein the membrane assembly has an inlet for receiving a sweep gas into the membrane assembly.

4. The membrane reactor of claim 1 wherein the reactor includes a water inlet, a water outlet and a water chamber in fluid communication there between, the water chamber being proximate the reaction zone to assist In controlling the temperature of the reaction zone.

5. The membrane reactor of claim 2 wherein the membrane is generally frustoconical in shape having an upstream end portion and a downstream end portion with the upstream end portion having a smaller periphery than the downstream end portion.

6. The membrane reactor of claim 1 wherein the membrane assembly includes a plurality of discrete support members with membranes thereon, the membranes being spaced increasingly closer together from the upstream to the downstream end of the membrane reactor.

7. The membrane reactor of claim 1 wherein a Fischer-Tropsch catalyst is disposed in the reaction zone.

8. The membrane reactor of claim 1 wherein the membrane assembly locates most of the membrane proximate the downstream portion of the reaction zone as opposed to the upstream portion to provide more water vapor removal capability proximate the downstream portion as opposed to the upstream portion of the membrane reactor.

9. The membrane reactor of claim 1 wherein the membrane assembly is generally concentric about an axis and has an upstream end and a downstream end.

10. The membrane reactor of claim 9 wherein the membrane is generally circular in cross-section and the radius of the membrane increases from the upstream end to the downstream end of the membrane assembly.

11. The membrane reactor of claim 9 wherein the membrane is included on a plurality of disks and the radii of the disks increases from the upstream end to the downstream end.

12. The membrane reactor of claim 9 wherein the membrane is included on a plurality of disks spaced along the axis with the disks being increasingly closely spaced together from the upstream end to the downstream end.

* * * * *